United States Patent [19]

Baker et al.

[11] 4,184,149

[45] Jan. 15, 1980

[54] AIR SPEED AND ATTITUDE PROBE

[75] Inventors: Gerald J. Baker, Lancaster; Merle A. Economu, Palmdale, both of Calif.

[73] Assignee: The United States of America as represented by the United States National Aeronautics and Space Administration, Washington, D.C.

[21] Appl. No.: 910,708

[22] Filed: May 30, 1978

[51] Int. Cl.² ..................... G01F 13/02; G01C 23/00
[52] U.S. Cl. ............................. 340/177 VA; 73/188; 73/189; 73/212
[58] Field of Search ................. 340/177 VA; 73/212, 73/188, 182, 186, 189

[56] References Cited

U.S. PATENT DOCUMENTS

| 2,554,634 | 5/1951 | Paine et al. | 73/212 |
| 2,850,896 | 9/1958 | Se Legue et al. | 73/188 |
| 3,670,569 | 6/1972 | Partzsch | 73/189 X |
| 3,812,712 | 5/1974 | Hoffman et al. | 340/177 VA X |
| 3,977,249 | 8/1976 | Wittig | 73/212 |
| 4,096,744 | 6/1978 | De Leo et al. | 73/212 |

Primary Examiner—Donald J. Yusko
Attorney, Agent, or Firm—Monte F. Mott; John R. Manning; Paul F. McCaul

[57] ABSTRACT

An air speed and attitude probe characterized by a pivot shaft normally projected from a data boom and supported thereby for rotation about an axis of rotation coincident with the longitudinal axis of the shaft, a tubular body supported for angular displacement about the axis of rotation, a fin mounted on the body for maintaining one end of the body in facing relation with relative wind, a pair of transducers mounted in the body for providing intelligence indicative of total pressure and static pressure for use in determining air speed, a stack of potentiometers coupled with the shaft for providing intelligence indicative of aircraft attitude, and circuitry connecting the transducers and potentiometers to suitable telemetry circuits.

4 Claims, 5 Drawing Figures

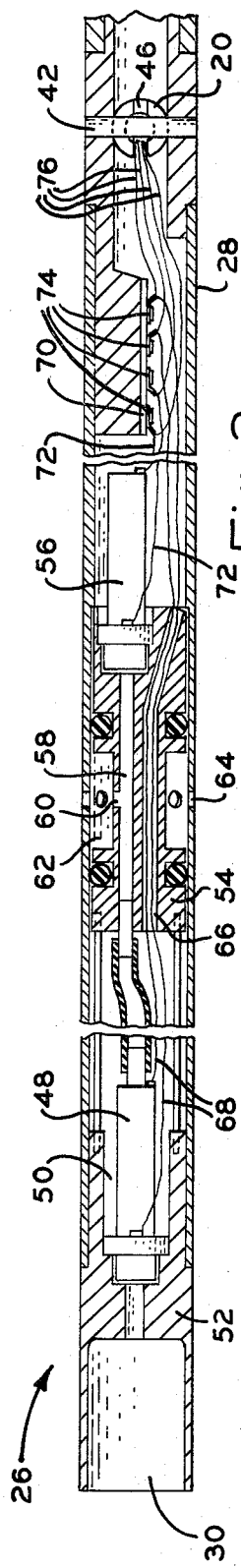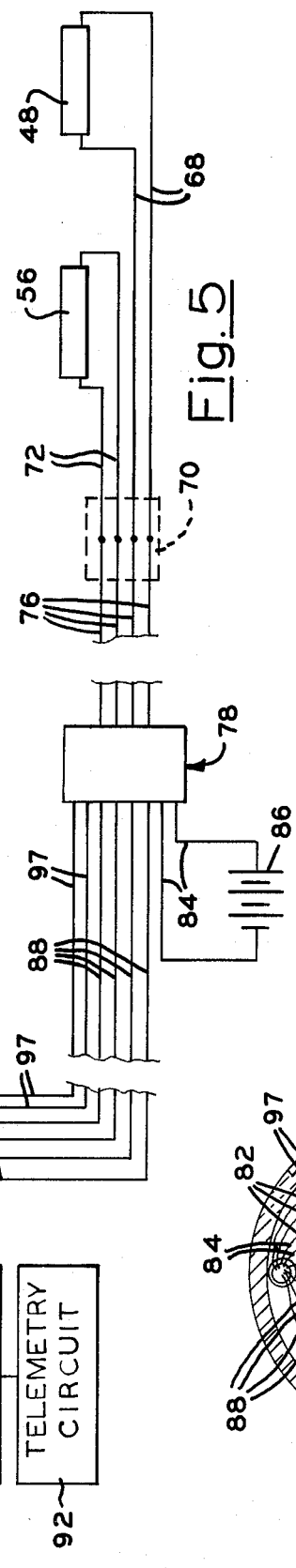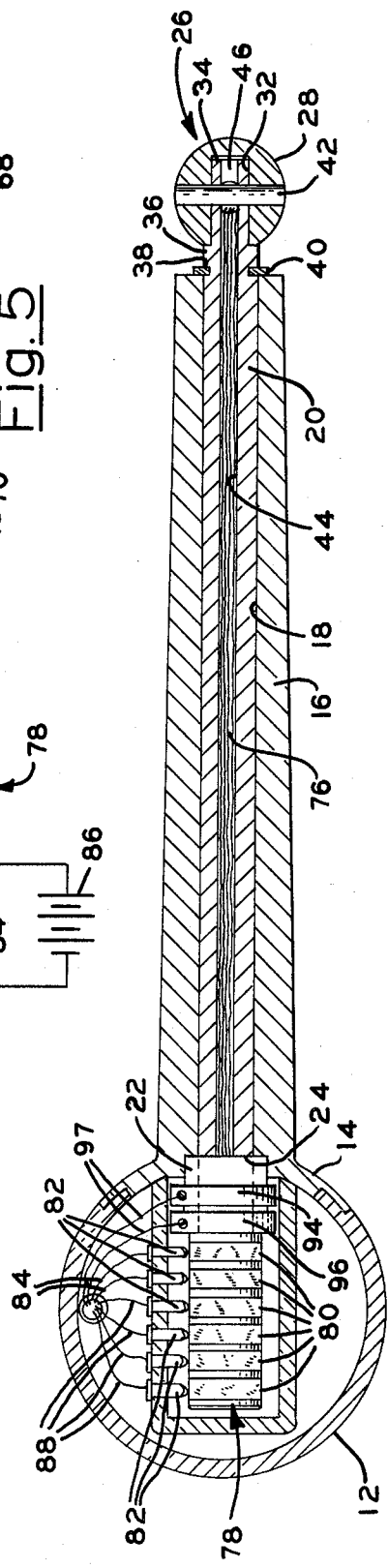

AIR SPEED AND ATTITUDE PROBE

ORIGIN OF THE INVENTION

The invention described herein was made by employees of the United States Government and may be manufactured and used by or for the Government for Government purposes without the payment of any royalties thereon or therefor.

BACKGROUND OF THE INVENTION

1. Field of the Invention

The instant invention generally relates to Pitot-static pressure probes and more particularly to a substantially free-floating probe adapted to detect and indicate precise aircraft air speed and attitude to be observed and studied in real time, or alternatively recorded for future study and analysis. 2. Description of the Prior Art The prior art, of course, includes numerous devices or probes such as Pitot-static probes, herein referred to simply as Pitot tubes, adapted to be mounted on aircraft and employed for detecting and indicating local air speed according to the equation $V = \sqrt{2(p_t - p)/\rho}$ where $V$ = velocity of the aircraft; $p$ = static pressure; $p_t$ = total pressure; and $\rho$ = the density of the air. Normally, such devices are fixed relative to the longitudinal axis of the aircraft on which they are mounted and provide accurate indications for air speed only when an aircraft is in a selected flight attitude. However, as the aircraft experiences unusual attitudes, which result in wind angles in excess of 15° to 20°, error in the thus provided intelligence is introduced. As a consequence, it often is necessary to calibrate these devices for given air speeds and/or specific flight attitudes.

Additionally, fixed devices, similar to Pitot tubes, have been provided with chamfered nozzles adapted to accommodate entry of angularly related relative wind for accommodating detection of air speed when the associated aircraft is expected to assume an unusual flight attitude. However, again in order to acquire accurate intelligence over a given range, calibration is required. Hence, it should now be appreciated that there currently exists a need for a probe having a capability of providing intelligence indicative of total pressure and static pressure, without regard to the attitude of the aircraft on which the probe is mounted.

It is, therefore, a general purpose of the instant invention to provide an air speed and relative wind direction probe particularly suited for use in providing intelligence accurately indicative of instantaneous local air speed and relative wind direction for an associated aircraft.

OBJECTS AND SUMMARY OF THE INVENTION

It is, therefore, an object of the instant invention to provide a simplified air speed and attitude probe.

It is another object to provide an improved probe characterized by a capability for providing accurate intelligence indicative of local air speed and aircraft attitude.

It is another object to provide a probe adapted to be mounted on a data boom and extended in parallelism with the longitudinal axis of symmetry for an aircraft for providing local air speed and aircraft attitude intelligence, although not necessarily restricted in use thereto since the probe of the instant invention may be useful when installed on mock-ups and the like subjected to wind tunnel analysis.

These and other objects and advantages are achieved through the use of a probe including both static pressure and total pressure transducers mounted in a tubular body supported for wind-induced angular displacement about an axis normally related to the longitudinal axis of an aircraft, as will become more readily apparent by reference to the following description and claims in light of the accompanying drawings.

BRIEF DESCRIPTION OF THE DRAWINGS

FIG. 3 is a cross sectional view taken generally along line 3—3 of FIG. 2.

FIG. 4 is a cross sectional view taken generally along line 4—4 of FIG. 2.

FIG. 5 is a schematic view diagrammatically illustrating the circuitry employed for the air speed and attitude probe illustrated in FIGS. 1 through 4.

DESCRIPTION OF THE PREFERRED EMBODIMENT

Figure 1:
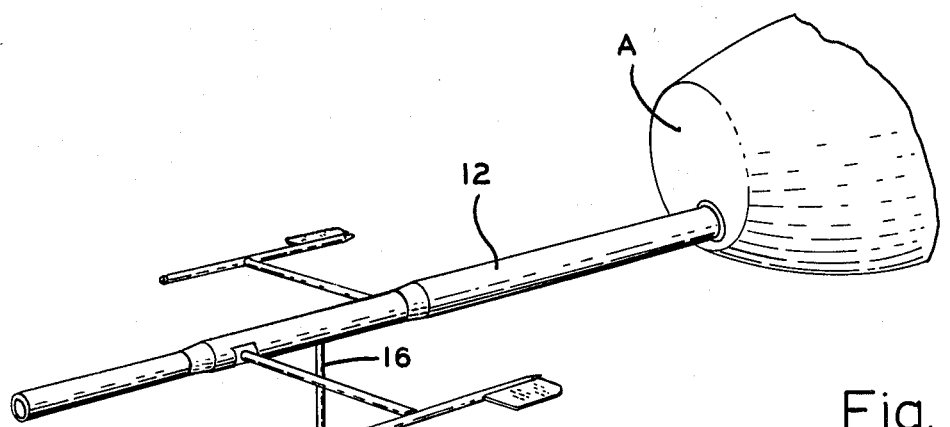
FIG. 1 is a fragmented perspective view illustrating a data boom having mounted thereon an air speed and attitude probe which embodies the principles of the instant invention.

Referring now with more particularity to the drawings, wherein like reference characters designate like or corresponding parts throughout the several views there is shown in FIG. 1 an air speed and attitude probe, generally designated 10, which embodies the principles of the instant invention.

As shown in FIG. 1, the probe 10 is mounted on a so-called data boom 12 projected from the nose of an aircraft, a fragment of which is shown and designated by the reference character A. As shown, the boom is extended in parallelism with the longitudinal axis of the aircraft.

Since the data boom 12 is of known design and the details thereof form no specific part of the instant invention, a detailed description thereof is omitted. However, it is to be understood that such a boom frequently is provided for aircraft, employed in research at altitudes, and serves as a mount for various instruments, such as angle of attack and spin-counting vanes, and the like not designated.

Figure 2:
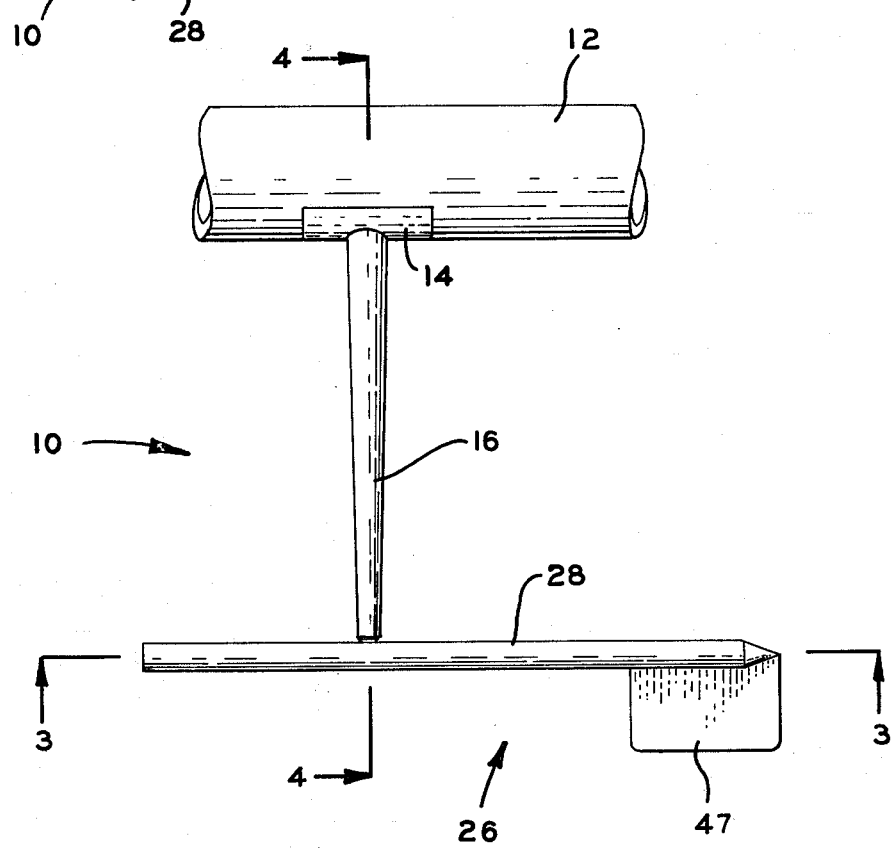
FIG. 2 is a fragmented elevational view, on a somewhat enlarged scale, of the probe shown in FIG. 1.

Turning now to FIG. 2, it can be seen that the probe 10 includes a base plate 14 mated with the boom 12. The plate 14 serves as a base for a column 16 which is, in turn, welded or otherwise rigidly affixed to the plate. As best illustrated in FIG. 4, the column 16 extends perpendicularly from the boom 12 and includes a cylindrical bore 18 within which there is disposed a pivot shaft 20. The shaft 20 projects from the bore 18 while to the base end thereof there is connected a bearing collar 22 seated in a socket 24 formed in the base end portion of the column. Thus the shaft 20 is supported at its base for angular displacement about its longitudinal axis.

To the distal end of the pivot shaft 20, opposite the base end, there is attached a probe 26. The probe 26 comprises a tubular body 28 having a total pressure orifice designated 30, comprising an open-end chamber. The tubular body 28 also is provided with a radial bore 32 of a diameter sufficient to receive a reduced portion 34 of the distal end of the pivot shaft 20. As a practical matter, the diameter of the portion 34 of the pivot shaft 20 is such as to provide a support collar 36 upon which is seated the body 28.

Between the collar 36 and the end portion of the column 16 there is formed an annular recess 38 within which there is seated a bearing washer 40. Where so desired, this washer comprises a split-ring and serves to prevent axial displacement of the pivot shaft 20 inwardly through the column 16.

It should now be apparent that the column 16 is mounted on the boom 12 and serves as a support for the pivot shaft 20 and that the pivot shaft 20 in turn serves to support the body 28 for rotation through 360°, about an axis coincident with the longitudinal axis of the column 16.

The body 28 is provided with a fin 47 lying in the longitudinal plane of symmetry for the body 28. In practice, a null position for the probe 26 is assumed when the tubular body 28 is positioned in parallelism with the longitudinal axis of the boom 12. However, the body may in flight be displaced from its null position as a consequence of the effect of relative wind acting on the fin 47, in much the same manner as a so-called weather vane is displaced in response to changes in wind direction.

Disposed within the tubular body 28, in communication with the orifice 30, there is mounted a total pressure transducer 48. As a practical matter, the transducer 48 comprises a differential transducer commercially available from Kulite Semi Conductor Products, Inc. of Richfield, New Jersey. Since the details of the transducer 48 forms no specific part of the instant invention, a detailed description thereof is omitted in the interest of brevity. It should be appreciated, however, that the transducer 48 is seated within an axial bore 50 provided in a distal plug 52, comprising the terminus of the tubular body 28, and communicates with the orifice. Epoxy or other suitable material is employed as desired for securing the transducer 48 within the bore 50.

Also seated within the bore 50 of the tubular body 28, there is an intermediate plug 54 of a spool-shaped configuration. The purpose of this plug is to support a static pressure transducer 56, also of a commercially available design. Again, since the details of the transducer 56 form no specific part of the instant invention, a detailed description thereof is omitted. It is to be understood, however, that the transducer 56 also is obtainable from Kulite Semi Conductor Products, Inc., aforementioned, and serves to detect changes in atmospheric pressures.

As a practical matter, the intermediate plug 54 includes a pressure conduit comprising an internal bore 58 through which communication is established between the transducers 48 and 56. Suitable openings 60 are provided for establishing communication between the bore 58 and a plenum chamber 62 of an annular configuration circumscribing the midportion of the plug 54. The pressure of chamber 62 is maintained at ambient atmospheric presure introduced via an array of bores 64 extended radially through the wall of the tubular body 28.

It should at this juncture be noted that a bore 66 is provided through the intermediate plug 54 and accommodates passage therethrough of electrical leads 68. These leads extend from the transducer 48 to a terminal board 70, also provided internally of the tubular body 28, preferably in close proximity with the distal end 34 of the pivot shaft 20.

As a practical matter, to the transducer 56 there is connected a pair of electrical leads 72 which also extend to the terminal board 70. While the terminal board 70 is of any suitable design, as shown, the board is provided with a plurality of binding posts 74. These posts are employed for connecting the electrical leads 68 and 72 with electrical leads 76 which are extended through the internal bore 44 of the pivot shaft 20 and connected with a slip ring assembly, generally designated 78. This assembly is mounted within the data boom 12 in close proximity with the base end of the column 16.

Slip ring assemblies, of course, are well known. Therefore, a detailed description of the slip ring assembly 78 is omitted in the interest of brevity. It suffices to understand that each of the leads 76 is connected with one of a plurality of slip rings 80 mounted to rotate with the pivot shaft 20. In practice, a battery 86 is connected to the assembly via a pair of leads 84 and serves as a source of electrical potential for the slip ring assembly 78, whereby a voltage continuously is applied across the transducers 48 and 56. Additionally, leads 88 are connected to the slip ring assembly 78 and serve to connect the assembly 78 to a signal processing circuit 90. This circuit is of any suitable design and, where desired, is connected with a telemetry circuit 92, also of known design. Of course, where preferred a recording circuit, not shown, is employed in lieu of the telemetry circuit. Since the details of the signal processing and telemetry circuits 90 and 92 form no specific part of the instant invention, a detailed description thereof is omitted.

Referring again to FIG. 4, it can be seen that also mounted on the pivot shaft 20 is a pair of potentiometers, designated 94 and 96. The potentiometers 94 and 96 also are connected with the source of electrical potential and include therein wiper arms, not shown, which ride on an annular surface for varying the resistance thereacross in proportion to the angular displacement of the pivot shaft 20 from its null position. Suitable leads 97 are provided for connecting the potentiometers to a recorder, not shown, or where desired, to the circuits 90 and 92.

Preferably, the potentiometer 94 serves to accurately measure angular changes within a 30° arc of angular displacement for the pivot shaft 20, while the potentiometer 96 serves as a revolution counter and measures angular displacement through 350° of rotation. It is therefore to be understood that the potentiometer 94 provides accurate intelligence within the 30° arc, indicative of each degree of angular displacement from the null position for the probe 26, while the potentiometer 96 serves to count revolutions of the probe 26 about an axis coincident with the axis of rotation for the pivot shaft 20. Thus the direction of the relative wind for the aircraft at all times parallels the axis of the probe 26 so that accuracy in air speed indications is enhanced and indications indicative of attitude are provided without requiring calibration. Of course, the probe 26 may be mounted to oscillate in a plane normal to the plane of the wing span rather than in a paralleling plane, as shown, in order to provide intelligence indicative of angle of attack or multiple probes may be employed simultaneously.

OPERATION

It is believed that in view of the foregoing description the operation of the device is apparent, however, it will be reviewed briefly at this point.

With a probe 26 mounted on its pivot shaft 20 and supported by a column 16, in a plane normal to the plane of the wing span for the aircraft, the probe 26 is readied for use in providing indications of air speed and attitude for an aircraft in flight.

During flight the orifice 30 of the tubular body 28 continuously is directed to face relative wind in response to relative wind striking the fin 47 in a manner consistent with that of a weather vane. Hence, regardless of whether the aircraft is experiencing a spin, skid or slip, the orifice 30 of the body 28 continuously is caused to face relative wind, as the probe is displaced in the plane of rotation of the body 28. Dynamic or total pressures are sensed by the transducer 48 and intelligence indicative of the air speed is delivered to the signal processing circuit 90, via the leads 68, 76 and the slip ring assembly 78. In a like fashion, static pressure is detected by the transducer 56 with intelligence indicative of static pressures being transmitted to the signal processing circuit 90, also via the slip ring assembly 78.

Where analysis is required on a real-time basis, the intelligence is transmitted to the telemetry circuit 92 for ultimate transmission to a surface station. However, in the event recording is desired a recording circuit of suitable design is substituted for the telemetry circuit 92. Of course, it always is possible to employ a recording circuit in conjunction with the telemetry circuit without departing from the instant teachings.

The shaft 20 of the probe 10, as shown, also rotates in a plane paralleling the wing span of the aircraft as unusual attitudes such as slip, skid, spin and the like are experienced. Of course, angular displacement of the shaft 20, relative to its null position, is detected by the potentiometers 94 and 96. Thus aircraft attitude is detected at the potentiometer 94 while the number of turns of a spin is detected by the potentiometer 96.

In view of the foregoing, it should be apparent that the instant invention provides a practical solution to the problem of economically and accurately providing intelligence indicative of air speed and altitude without necessitating calibration for selected attitudes.

What is claimed is:

1. In a probe for use in determining local air speed and attitude for an aircraft having mounted thereon a data boom forwardly projected in parallelism with the longitudinal axis of symmetry thereof, a pivot shaft mounted on said boom having a longitudinal axis orthogonally related to the longitudinal axis of the data boom and a flow direction vane including a tubular body supported by the shaft for rotation about an axis of rotation coincident with the longitudinal axis of the shaft and characterized by an open-end cavity defining an orifice, a pressure chamber maintained at ambient atmospheric pressure, and a fin mounted on the body for maintaining the open-end cavity in facing relation with relative wind, the improvement comprising:

A. means including a total pressure transducer mounted in the body in communication with the orifice and a static pressure transducer mounted in the body in communication with the pressure chamber;

B. circuit means adapted to connect said transducers to a telemetry circuit; and C. means for detecting angular displacement of said tubular body about said axis of rotation including a first potentiometer for counting revolutions of said tubular body about said axis of rotation, and a second potentiometer for measuring instantaneous angular displacement of said tubular body about said axis.

2. The improvement of claim 1 wherein said circuit means includes a slip-ring assembly connected between each transducer and said telemetry circuit for accommodating rotation of said pivot shaft about said axis of rotation.

3. A probe adapted to be mounted in a data boom and employed in determining local air speed and attitude of an aircraft in flight comprising:

A. a base plate adapted to be mated with a data boom projected from an aircraft;

B. a rigid column affixed to said base plate;

C. a pivot shaft concentrically received within said rigid column and supported thereby for displacement about an axis of rotation coincident with the longitudinal axis of symmetry for said column;

D. a tubular body having an open end normally related to said axis of rotation and rigidly affixed to said pivot shaft;

E. a first transducer mounted in said tubular body for detecting total pressure and a second transducer mounted in said body for detecting static pressure;

F. means connected to said pivot shaft for detecting angular displacement of said pivot shaft about said axis of rotation including a first potentiometer for counting revolutions of said tubular body about said axis of rotation, and a second potentiometer for measuring instantaneous angular displacement of said tubular body about said axis; and G. means mounted on said tubular body for directing the open end of the tubular body into relative wind.

4. The probe of claim 3 wherein said means for directing the open-end of the tubular body into relative wind comprises a fin mounted on the tubular body and disposed in a plane extended the length thereof.

* * * * *